UNITED STATES PATENT OFFICE.

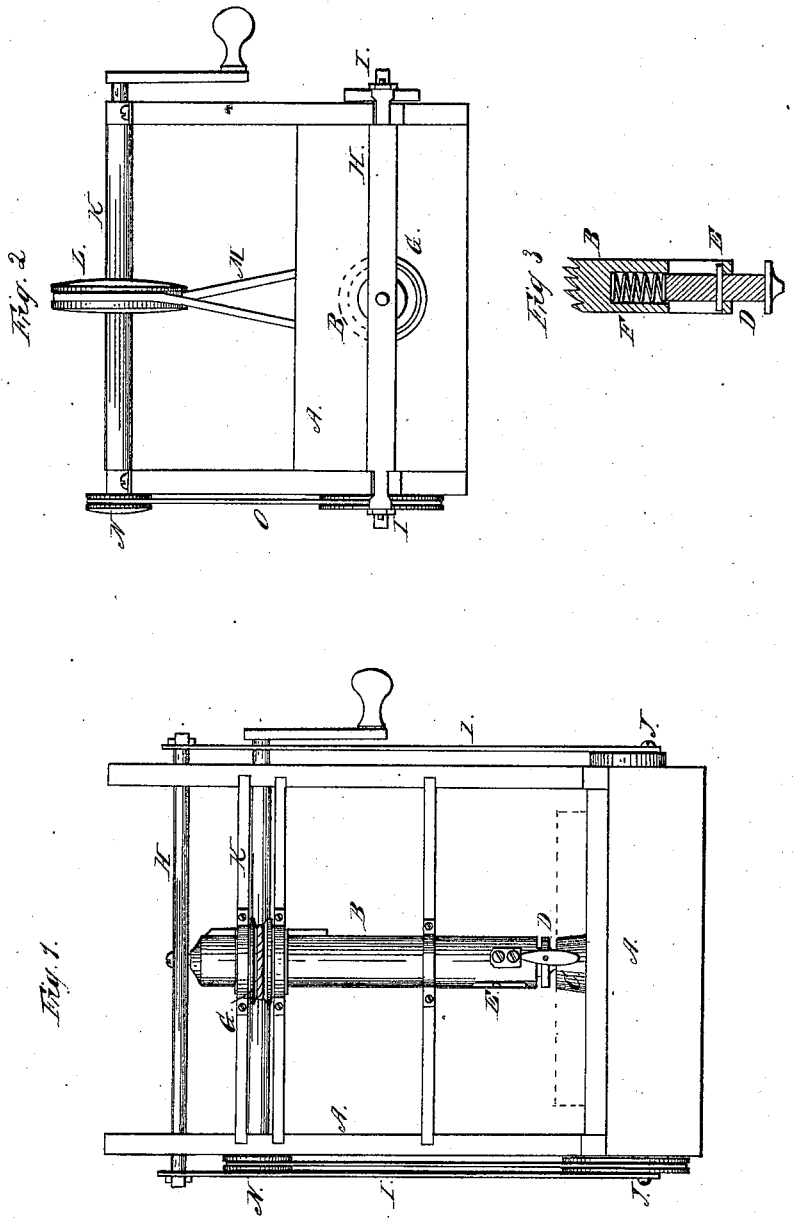

PHILIP C. TRAVER, OF NEWBURGH, NEW YORK.

MACHINERY FOR CUTTING CORK.

Specification of Letters Patent No. 5,003, dated March 6, 1847.

*To all whom it may concern:*

Be it known that I, PHILIP C. TRAVER, of the town of Newburgh, in the county of Orange and State of New York, have invented a new and useful Machine for Cutting Corks, which is described as follows, reference being had to the annexed drawings of the same, making part of this specification.

Figure 1 is a front elevation of the machine. Fig. 2 is a top view. Fig. 3 is a section of mandrel and centerer.

The nature of this invention consists in cutting corks in the form of a frustum of a cone, or cylinder from a sheet of cork (fed by hand or machinery) by means of a cutter fastened to the periphery of a hollow mandrel having a compound longitudinal and rotary motion around a center or axis of a cylindrical sliding holder inserted into a corresponding aperture in the mandrel and bearing upon the sheet of cork; in which hollow mandrel is placed a spiral spring, bearing against the upper end of the holder, the lower end of the holder guiding the cutter at the required angle to give the required taper to the cork.

A is the frame made of suitable size, strength and material for the purpose intended.

B is the hollow revolving mandrel in which the sliding centerer, holder, and guide is inserted; and to which mandrel the knife or cutter is secured.

C is the cutter made concave or otherwise on the face secured to the periphery of the mandrel by suitable fastenings.

D is the sliding center, holder and guide for centering and holding the cork and guiding the knife for giving the required taper to the cork—the angle of the knife being determined by a projection on the guide, or a set screw inserted into it, against which the knife is placed.

E are arms or shoulders projecting from the periphery of the holder and entering oblong mortises in the mandrel to allow of its having a vertical movement and preventing it from revolving in the mandrel. The arms however may be omitted when it is desired to have the holder revolve in the mandrel. The lower end of the holder may be made like an inverted cone, or it may be made flat or concave.

F is a spiral spring placed in a recess in the mandrel and bearing against the mandrel and upper end of the holder to keep it against the cork. Other forms of springs may be used, arranged differently to effect the same object. The spring contracts when the mandrel is carried down over the holder.

G is a pulley for turning the mandrel and through which it slides, being prevented from turning horizontally in the pulley by a long cog or the side of the mandrel which enters a corresponding groove in the center of the pulley.

H is a cross head attached to the top of the mandrel.

I I are arms attached to the ends of the cross head and to the wrists of cranks.

J are wrists of cranks or pins inserted into the sides of the pulleys or wheels on a revolving crank shaft.

K is the driving shaft turning in suitable boxes in the frame and carrying pulleys and bands or other gearing to propel the mandrel.

L is a pulley on the said driving shaft.

M is a band leading around said pulley L and around the pulley on the mandrel.

N is another pulley on the driving shaft.

O is a band leading from said pulley N to the pulley of the crank shaft for turning said crank shaft in order to raise and lower the mandrel while it is turned by the pulleys and band aforesaid. There may be any required number of these mandrels holders and cutters arranged in the frame for cutting any desired number of corks from one or more sheets of cork.

The cork will be fed to the cutters by any suitable mechanical means, or by hand.

Operation: The machine being in motion place a sheet of cork on the frame; the descent of the mandrel will bring the center, holder, and guide down upon the cork by which it will be held and centered; the knife will then enter the cork and cut around the center in a circle equal to the diameter of the required cork until it passes entirely through the cork; the mandrel will then rise carrying with it the cutter and holder till clear of the sheet of cork whose position is then changed for a repetition of the operation which takes place at every revolution of the crank shaft.

The operation of the mandrel may be effected by means of the before described crank shaft, bands and pulleys; or by any means substantially the same whether by cogged gearing or otherwise.

What I claim as my invention and desire to secure by Letters Patent is—

The before described mode of cutting corks by means of the aforesaid combination of the hollow mandrel—sliding holder, centerer and guide—with the cutter, for cutting the cork to the required shape—said cutter having a simultaneous longitudinal and revolving motion produced by the means described, or other more suitable means,—operating substantially in the manner set forth.

PHILIP C. TRAVER.

Witnesses:
WM. P. ELLIOT,
ALBERT E. H. JOHNSON.